United States Patent Office 3,577,458
Patented May 4, 1971

3,577,458
PROCESS FOR THE PREPARATION OF ISOCYANATES
Arthur M. Brownstein, Morristown, and John P. Sibilla, Livingston, N.J., assignors to Allied Chemical Corporation, New York, N.Y.
No Drawing. Original application Nov. 14, 1966, Ser. No. 593,668, now Patent No. 3,465,024, dated Sept. 2, 1969. Divided and this application Feb. 3, 1969, Ser. No. 828,024
Int. Cl. C07c *119/00*
U.S. Cl. 260—545                              3 Claims

ABSTRACT OF THE DISCLOSURE

This invention is directed to the diacetate ester of certain dihydroxamic acids; said acetate esters can be decomposed to form isocyanates.

---

This is a division of application of Ser. No. 593,668 filed Nov. 14, 1966, now Pat. No. 3,465,024.

It is known that isocyanates may be prepared by the thermal decomposition of hydroxamic acids or their derivatives. This reaction is commonly called the Lossen Rearrangement. Unfortunately the Lossen Rearrangement rarely stops at the isocyanate stage. Water or carboxylic acid by-products usually react readily in situ with the isocyanate as soon as it is formed and convert it to an amide, amine or urea. These undesirable reactions may be illustrated by the following equations:

LOSSEN REARRANGEMENT

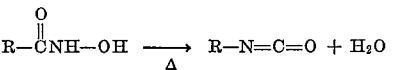

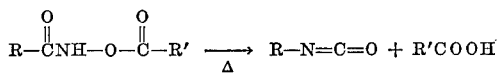

UNDESIRABLE SIDE REACTIONS

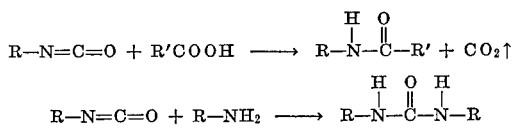

wherein R and R' represent a hydrocarbon radical selected from the group consisting of aliphatic hydrocarbons containing from 1 to 20 carbon atoms, alicyclic hydrocarbons containing from 3 to 20 carbon atoms and mononuclear aromatic hydrocarbons containing from 6 to 20 carbon atoms.

In practice, therefore, because of the facile occurrence of these side reactions, many isocyanates cannot be prepared at all by the Lossen Rearrangement and in most other cases the yields of isocyanate which can be isolated are rather low.

Several variations of the basic Lossen Rearrangement have been developed which seek to avoid these undesirable side reactions by utilizing derivatives of hydroxamic acids which form non-reactive side products on undergoing thermal decomposition. A process described in U.S. Pat. 2,394,597 (Dickoy et al.) discloses dehydrating aliphatic dihydroxamic acids and their metal salts with phosgene or thionyl chloride. On heating, the intermediate chloroformate or chlorosulfite esters form aliphatic diisocyanates plus carbon dioxide or sulfur dioxide and hydrochloric acid. This preparative technique is considered impractical however because of the generally low yields obtained and the highly corrosive and toxic nature of both the reactants and the by-products.

Another process has been disclosed by T. Mukaiyama in J. Org. Chemistry, 26, 782 (1961), whereby hydroxamic acids are reacted with diketene to form the corresponding acetoacetates. These acetoacetates can be thermally decomposed to form isocyanates, carbon dioxide and acetone. This process give good yields of isocyanate and avoids the use of corrosive intermediates and by-products, but it also is not considered practical because a high temperature of decomposition, ca. 400° C., is required. In addition, only about one-half of the acetone by-product can be recovered to prepare additional diketene for a succeeding cycle of operation. Thus, the cost of raw materials is relatively high.

It is an objective of this invention to provide a novel and more efficient process for the preparation of aliphatic, alicyclic and aromatic mono and diisocyanates by the thermal decomposition of acetate esters of hydroxamic acids.

It is a further object of this invention to provide novel intermediates for the preparation of aliphatic and aromatic diisocyanates.

It is another object of the invention to provide an improved and more practical process for preparing isocyanates continuously and in higher yields.

These and other objects are accomplished according to our invention wherein aliphatic, alicyclic and aromatic hydroxamic acid acetate esters are decomposed to isocyanates by heating them in an inert gas atmosphere at temperatures of at least above the melting point of the acetate and recovering the resulting isocyanates.

Certain aliphatic and aromatic hydroxamic mono and di acid acetate esters employed in the practice of the process of this invention are known in the art; certain others herein described have not heretofore been prepared.

In carrying out the process of our invention, a hydroxamic acid having the formula R—(CONHOH)$_n$, wherein R is an aliphatic radical containing from 1 to 20 carbon atoms, an alicyclic radical containing from 3 to 20 carbon atoms, or a mononuclear aryl radical containing from 6 to 20 carbon atoms and $n$ is an integer from 1 to 2, is reacted with acetic anhydride or acetyl chloride to form the corresponding acetate ester:

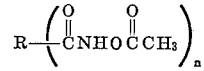

The hydroxamic acid acetate ester is decomposed by heating at moderate temperatures in an inert atmosphere. The products of decomposition, that is, the isocyanate and acetic acid, are separated and collected. In this manner, as illustrated in the reaction below, a high yield of isocyanate is obtained.

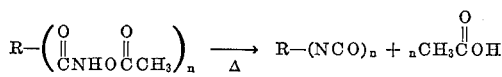

Our process is applicable to the preparation of a wide variety of isocyanates including both mono and difunctional aliphatic and aromatic isocyanates. The acetic acid by-product may be recovered and converted to acetic anhydride or acetyl chloride for reuse in a succeeding cycle of operation, thereby contributing to the low cost of our process.

Hydroxamic acids, used as starting materials in our process, are known compounds which can be prepared by known methods, as for example, the method disclosed by Renfro and Hauser (J. Am. Chem. Soc. 59, 2313 (1937)), whereby hydroxylamine hydrochloride is neutralized with an alkali metal hydroxide to the free amine and the alkali metal chloride salt which precipitates is discarded. The desired carboxylic acid ester is added to the neutral hydroxylamine and the resulting hydroxamic acid product recovered.

Acids which are suitable for preparing the starting materials of our process, as noted hereinabove, include aliphatic, alicyclic and mononuclear aromatic hydroxamic acids. The term "mononuclear aromatic" contemplates phenyl, alkaryl and aralkyl radicals. Illustrative acids, for example, include ortho, meta and para phthalic, alkylated phthalic acids, butyric, caproic, polargonic, lauric and stearic acids, adipic, azelaic, sebacic and eicosane dicarboxylic acids, benzoic, phenyl acetic and p-toluic acids.

As is known, aromatic and aliphatic hydroxamino acids can be acetylated readily in an excess of acetic anhydride which can act as both solvent and reactant. However, we have found some aliphatic dihydroxamic acids, such as adipic and sebacic, in addition to the usual acetylation of oxygen atoms, undergo acetylation of the nitrogen atoms as well, forming tetraacetates which do not undergo decomposition and are therefore undesirable. For such dihydroxamic acids, no more than a 10% molar excess of acetic anhydride should be used for the acetylation and equimolar amounts of acetic anhydride and hydroxamic acid are preferred. An inert solvent such as acetone or ethyl acetate may be employed during the acetylation. Excess acetic anhydride and solvent may be removed in any suitable manner known by those skilled in the art. A simple procedure is to precipitate the hydroxamic acetate ester by adding water to the reaction solution and collecting the precipitated ester by filtration.

Hydroxamic acetates are decomposed according to our invention by heating them either neat or in an inert solvent in an inert atmosphere at temperatures of at least about the melting point of the particular acetate. While temperatures up to about 400° C. may be used, we have found that at relatively high temperatures, e.g. above about 300° C., the yield of isocyanate obtained in most instances tends to decrease substantially. We, therefore, prefer to carry out the decomposition between about 150° C. and about 250° C. Only a short time is required for decomposition and heating is generally continued only for that period required to obtain the maximum yield of isocyanate, usually not more than about 5 minutes.

It is necessary that an inert atmosphere be maintained during the decomposition to prevent side reactions which would lower the yield of isocyanates. In the preferred embodiment of this invention a closed system consisting of a decomposition chamber and an exhaust chamber which may be filled with an inert packing, as for example a gas chromatography column, is purged with an inert, dry gas such as nitrogen, helium argon, carbon dioxide and the like. The hydroxamic acid acetate is introduced into the decomposition chamber portion of the closed system either neat or in an inert carrier. Thereafter the temperature is raised to the decomposition point of the acetate.

While batch operation may be employed, advantageously and preferably a moving inert gas stream is maintained through the decomposition chamber to carry the vapors of the decomposition products out of the heating zone through the exhaust chamber to be cooled and collected. Gas velocities of from about 5 cm. to about 5000 cm./min. and preferably about 50 cm. to 1000 cm./min. may be employed. Because of its significantly lower boiling point the vapors of the acetic acid by-product will ordinarily be eluted first. By cooling and condensing these vapors, the acetic acid may be recovered and dehydrated to form acetic anhydride for reuse in a succeeding cycle of operation to prepare the acetate esters of the instant invention. Cooling to the temperature of liquefaction of the subsequently eluted higher boiling vapors affords the desired isocyanate product in better yield than if the decomposition is carried out under a static inert atmosphere.

A catalyst is not required in our process and excellent yields of isocyanate have been obtained without the use of a catalyst. In some cases, the use of a catalyst may be benecial in improving the isocyanate yield. For this purpose a basic salt may advantageously be employed as catalyst. Suitable illustrative examples or catalysts are sodium hydroxide, calcium oxide, sodium carbonate and the like. The requirements of solvent and catalyst to obtain the best yields of isocyanate for each system of hydroxamic acetate and temperature of decomposition can be determined experimentally.

This invention can be more fully understood by reference to the following examples.

EXAMPLE 1

Preparation of N-benzoyl-O-acetyl hydroxylamine 0.1 mol benzohydroxamic acid was dissolved in 50 ml. of warm acetic anhydride. The resultant clear solution was treated with 250 ml. of cold water causing a solid to precipitate. After cooling in an ice bath for one hour, the precipitate was collected by filtration, washed with water and recrystallized from benzene-petroleum ether. N-benzoyl-O-acetyl hydroxylamine was recovered in 70.5% yield; melting point 126.5°–128° C. The ferric chloride test for hydroxamic acid was negative.

Part A—Decomposition of N-benzoyl-O-acetyl hydroxylamine under a nitrogen blanket.—0.0223 mol of N-benzoyl-O-acetyl hydroxylamine, as prepared above, was dissolved in 50 ml. of O-dichlorobenzene and charged to a three-necked flask fitted with a distillation head, stirrer, thermometer and gas inlet. The flask was blanketed with nitrogen and heated rapidly to 150° C. After 10 minutes, the flask was cooled and the contents filtered. A 51.2% yield of phenyl isocyanate was obtained as determined by vapor phase chromatographic analysis of the filtered reaction mixture.

Part B—Decomposition of N-benzoyl-O-acetyl hydroxylamine in an inert gas stream.—0.0986 gram of N-benzoyl-O-acetyl hydroxylamine, as prepared above, was dissolved in 1.90 grams of dimethylformamide and an aliquot of this solution charged to the injection port of a 15' vapor phase chromatography column of ¼-inch copper tubing packed with 22.5% SE–30 silicone oil on Chromosorb P firebrick. A gas flow of 85 cc./min. of dry helium was maintained through the column. The temperature at the injection port was 230° C. A 92.2% yield of phenyl isocyanate was obtained.

The experiment was repeated using 0.42 gram of N-benzoyl-O-acetyl hydroxylamine dissolved in 10.0 grams of nitrobenzene. An 89% yield of phenyl isocyanate was thereby obtained.

A comparison of the yields obtained in Parts A and B of this example serves to illustrate the improved yield of our process wherein the decomposition is carried out in isocyanate obtainable with the preferred embodiment of a moving inert gas stream.

EXAMPLE 2

Preparation of N,N'-isophthaloyl-O,O'-diacetyl dihydroxylamine 0.22 mol of hydroxylamine hydrochloride was dissolved in 80 ml. of methanol and cooled to 40° C. 0.3 mol of potassium hydroxide was added with stirring and the potassium chloride which precipitated separated by filtration. 0.1 mol dimethyl isophthalate, dissolved in 50 ml. of methanol, was added to the filtrate with stirring; the mixture warmed to 50° C., and cooled in an ice bath for one hour. The precipitate which formed was separated by filtration and the filtrate concentrated on a steam bath under vacuum. The resultant oil was taken up in sodium carbonate solution, filtered and neutralized with hydrochloric acid.

Isophthaloyl hydroxamic acid precipitated as a solid and was collected by filtration. The ferric chloride test for hydroxamic acid was strongly positive.

0.2 mol of acetic anhydride was added to the above hydroxamic acid and the solution warmed to 85° C. One hundred milliliters of water was added with stirring and the aqueous solution stirred in an ice bath for one hour at which time N,N'-isophthaloyl-O,O'-diacetyl dihydroxylamine precipitated and was collected by filtration. It was obtained in 42.3% yield; melting point 193°–195° C. The ferric chloride test for hydroxamic acid was negative. Infrared analysis confirmed the proposed structure.

*Elemental analysis.*—Calculated for $C_{12}H_{12}N_2O_6$ (percent): C, 51.4; H, 4.28; N, 10.1. Found (percent): C, 51.3; H, 4.40; N, 9.60.

Part A—Decomposition of N,N'-isophthaloyl-O,O'-diacetyl dihydroxylamine under a nitrogen blanket.—7.15 mols of N,N'-isophthalolyl-O,O'-diacetyl dihydroxylamine, as prepared in Example 2, was charged to a three-necked flask, as in Example 1, and dissolved in 50 ml. of nitrobenzene. The flank was blanketed with nitrogen and the temperature was raised to 205° C. for 10 minutes. Carbon dioxide was evolved and acetic acid and solvent distilled off. The reaction mixture was cooled to 15° C., 10 ml. of methanol was added and the solution warmed to 63° C. for 30 minutes.

The solvent was removed by vacuum distillation. The residue was a syrup-like uncrystallizable tar which was not amenable to purification.

Part B—Decomposition of N,N'-isophthaloyl-O,O'-diacetyl dihydroxylamine in an inert gas stream.—0.1 gram of N,N'-isophthaloyl-O,O'-diacetyl dihydroxylamine, as prepared above was dissolved in 5.4 grams of nitrobenzene and a portion of this solution was charged to a vapor phase chromatography column as in Example 1. The injection port temperature was 240° C. A 20% yield of m-phenylene diisocyanate was obtained.

A comparison of Parts A and B serves to illustrate the advantages obtained from employing the preferred embodiment of our invention. In this case, decomposition under an inert gas blanket afforded no product, while decomposition under an inert gas stream afforded the desired product in 20% yield.

EXAMPLE 3

Preparation of N,N'-adipoyl-O,O'-diacetyl dihydroxylamine 0.60 mol of potassium hydroxide in 100 ml. of methanol was added with stirring to 0.40 mol of hydroxylamine hydrochloride in 200 ml. of methanol. The mixture was cooled to 5° C. and the potassium chloride which precipitated removed by filtration. 0.10 mol of dimethyl adipate was added and the mixture allowed to stand for one hour. The precipitate which formed was collected by filtration, the filtrate concentrated affording additional precipitate which was also collected by filtration and the combined solids dissolved in water. The aqueous solution was neutralized with 6 N HCl and evaporated to dryness. The residue was recrystallized from absolute ethanol affording adipoylhydroxamic acid as a white solid; melting point 155°–158° C. It was soluble in dimethylformamide, insoluble in acetone, chloroform, ether and acetonitrile. The structure was confirmed by infrared analysis. The ferric chloride test for hydroxamic acid was positive.

0.001 mol of adipoylhydroxamic acid was slurried in 25 ml. of acetone, 0.0023 mol of acetic anhydride was added with stirring and the resulting mixture refluxed for 30 minutes. Ten milliliters of water were added and the resulting N,N'-adipoyl-O,O'-diacetyl dihydroxylamine collected by filtration. It was obtained in 56% yield as a solid; melting point 185°–187° C. with some decomposition. The proposed structure was confirmed by infrared analysis.

*Elemental analysis.*—Calculated for $C_{10}H_{16}N_2O_6$ (percent): C, 46.16; H, 6.15; N, 10.77. Found (percent): C, 45.7; H, 6.25; N, 10.80. The product was soluble in dimethylformamide and insoluble in chloroform, acetone, ethyl acetate, ether and acetonitrile.

Decomposition of N,N'-adipoyl-O,O'-diacetyl dihydroxylamine in solvent and in presence of basic catalyst N,N'-adipoyl-O,O'-diacetyl dihydroxylamine, as prepared above, was dissolved in dimethylformamide to form a 4.9% solution. A portion of this solution was charged to a vapor phase chromatograph column as in Example 1. 1,4-diisocyanatobutane was obtained in 17% yield.

The experiment was repeated using a solid mixture of 0.1139 gram of benzophenone, 0.085 gram N,N'-adipoyl-O,O'-diacetyl dihydroxylamine and 0.686 gram of sodium carbonate. 1,4-diisocyanatobutane was obtained in 24% yield. This example demonstrates that in some instances a basic catalyst may advantageously be employed.

EXAMPLE 4

Preparation of N,N'-sebacoyl-O,O'-diacetyl dihydroxylamine

A solution of 0.393 mol of sodium hydroxide in 100 ml. of methanol was added to 0.26 mol of hydroxylamine hydrochloride in 100 ml. of methanol. The mixture was cooled to 5° C. and the sodium chloride which precipitated separated by filtration. 0.07 mol of diethyl sebacate was added with stirring and the mixture allowed to stand overnight. The resultant precipitate was collected by filtration, refluxed in acetic acid and again collected by filtration. It was dried in a vacuum oven at 100° C. affording sebacoyl hydroxamic acid as a solid; melting point 141°–144° C. Infrared analysis confirmed the proposed structure.

0.013 mol of sebacoyl hydroxamic acid and 0.029 mol of acetic anhydride were slurried in 30 ml. of acetone and the mixture refluxed for 30 minutes. Five milliliters of water were added causing the product to precipitate.

A quantitative yield of N,N'-sebacoyl-O,O'-diacetyl dihydroxylamine, melting point 148° C. to 151° C. with some decomposition, was recovered by filtration. The ferric chloride test for hydroxamic acid was negative. Infrared analysis confirmed the proposed structure. The product was soluble in dimethylformamide, slightly soluble in chloroform and nitrobenzene and insoluble in carbon disulfide, carbon tetrachloride, tertiary butanol, acetonitrile, dioxane, acetone and ethyl acetate.

Decomposition of N,N-sebacoyl-O,O'-diacetyl dihydroxylamine

A portion of a solid mixture of 0.065 gram of N,N'-sebacoyl-O,O'-diacetyl dihydroxylamine, as prepared above, and 0.0581 gram of benzophenone was charged to the injection port of a vapor phase chromatograph as in Example 1. 1,8-diisocyanatooctane was obtained in 29.1% yield.

EXAMPLE 5

Preparation of N-lauroyl-O-acetyl hydroxylamine 0.25 mol of lauroylhydroxamic acid is diisolved in 200 ml. of warm acetic anhydride. The solution is maintained at 75° C. for two hours. The clear solution is then cooled to room temperature, 500 ml. of water added, and the resulting mixture cooled in an ice bath for one hour. The product which precipitates out is collected by suction filtration, affording N-lauroyl-O-acetyl hydroxylamine in 78% yield. Negative ferric chloride test.

Decomposition of N-lauroyl-O-acetyl hydroxylamine

Decomposition of N-lauroyl-O-acetyl hydroxylamine is carried out according to the procedure of Example 1, Part B, affording a 73% yield of 1-undecyl isocyanate, a monobasic aliphatic isocyanate.

EXAMPLE 6

Decomposition of N-phenylacetyl-O-acetyl hydroxamic acid

A mixture of equal parts by weight of benzophenone and N-phenylacetyl-O-acetyl hydroxamic acid prepared as in Example 5 and decomposed according to the procedure of Part B, Example 1, affords a 58% yield of benzyl isocyanate. Infrared spectrographic analysis of the product shows the typical strong isocyanate absorption band at 2300 cm.$^{-1}$.

EXAMPLE 7

Decomposition of N-(p-toluoyl)-O-acetyl hydroxylamine

A mixture of equal parts by weight of sodium hydroxide benzophenone and N-(p-toluoyl)-O-acetyl hydroxylamine, prepared as in Example 5, and decomposed according to the procedure of Example 1, Part B, affords a 37% yield of p-tolyl isocyanate. An infrared absorption spectrum of the product shows bands at 1600 cm.$^{-1}$ (medium), 2300 cm.$^{-1}$ (strong) and 830 cm.$^{-1}$ (broad and strong).

Examples 6 and 7 demonstrate that the process of our invention is applicable to the preparation of aralkyl and alkaryl isocyanates.

EXAMPLE 8

Decomposition of N-hexahydrobenzoyl-O-acetyl hydroxylamine

A saturated benzene solution of N-hexahydrobenzoyl-O-acetyl hydroxylamine, decomposed as in Example 1, Part B, affords a 76% yield of cyclohexyl isocyanate. The product shows infrared absorption bands at 2950 cm.$^{-1}$ and 2300 cm.$^{-1}$ (both strong).

Various modifications will be apparent to one skilled in the art and it is not intended that this invention be limited to the specific details in the examples presented by way of illustration. Accordingly the scope of the invention is limited only by the appended claims.

We claim:
1. N,N'-isophthaloyl-O,O'-diacetyl dihydroxylamine.
2. N,N'-adipoyl-O,O'-diacetyl dihydroxylamine.
3. N,N'-sebacoyl-O,O'-diacetyl dihydroxylamine.

References Cited

UNITED STATES PATENTS 3,446,613    5/1969    Berliner et al. _____ 71—118

LEWIS GOTTS, Primary Examiner

R. GERSTL, Assistant Examiner